United States Patent
Kunishi et al.

(10) Patent No.: US 10,030,101 B2
(45) Date of Patent: Jul. 24, 2018

(54) BRANCHED POLYCARBONATE PRODUCTION METHOD

(71) Applicant: IDEMITSU KOSAN CO., LTD., Tokyo (JP)

(72) Inventors: Noriyuki Kunishi, Ichihara (JP); Kazuhiro Sekiguchi, Chiba (JP); Yukiko Nagao, Tokyo (JP); Masayuki Takahashi, Taipei (TW); Kenji Sasaki, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/523,918

(22) PCT Filed: Nov. 6, 2015

(86) PCT No.: PCT/JP2015/081309
§ 371 (c)(1),
(2) Date: May 2, 2017

(87) PCT Pub. No.: WO2016/072491
PCT Pub. Date: May 12, 2016

(65) Prior Publication Data
US 2017/0313817 A1 Nov. 2, 2017

(30) Foreign Application Priority Data
Nov. 7, 2014 (JP) ................. 2014-227409

(51) Int. Cl.
*C08G 64/06* (2006.01)
*C08G 64/24* (2006.01)

(52) U.S. Cl.
CPC ............. *C08G 64/24* (2013.01); *C08G 64/06* (2013.01)

(58) Field of Classification Search
USPC ........................................ 528/169, 196, 198
See application file for complete search history.

(56) References Cited

FOREIGN PATENT DOCUMENTS

| JP | S59-191717 A | 10/1984 |
|---|---|---|
| JP | H07-102055 A | 4/1995 |
| JP | H07-103235 B2 | 11/1995 |
| JP | 2005-126478 A | 5/2005 |
| JP | 2005-239876 A | 9/2005 |
| JP | 2015-229766 A | 12/2015 |
| WO | WO-2011/043484 A1 | 4/2011 |

OTHER PUBLICATIONS

International Search Report for International Patent Application No. PCT/JP2015/081309 dated Feb. 9, 2016.

*Primary Examiner* — Terressa Boykin
(74) *Attorney, Agent, or Firm* — Foley & Lardner LLP

(57) ABSTRACT

Provided is a method of producing a branched polycarbonate, including: a step (a) of subjecting an alkali aqueous solution of a dihydric phenol, phosgene, and a branching agent to a phosgenation reaction in the presence of an organic solvent to provide a reaction liquid; a step (b) of adding the alkali aqueous solution of the dihydric phenol and a polymerization catalyst to the reaction liquid obtained from the step (a) to provide a reaction liquid containing a polycarbonate oligomer; a step (c) of separating the reaction liquid containing the polycarbonate oligomer obtained in the step (b) into an organic solvent phase containing the polycarbonate oligomer and an aqueous phase; and a step (d) of causing the organic solvent phase containing the polycarbonate oligomer separated in the step (c) and the alkali aqueous solution of the dihydric phenol to react with each other to provide a reaction liquid containing the branched polycarbonate, in which a ratio (x/y) of an addition amount of the polymerization catalyst to be added in the step (b), which is represented by x mol/hr, to a chloroformate group amount of the polycarbonate oligomer in the reaction liquid obtained from the step (b), which is represented by y mol/hr, is 0.0035 or more.

11 Claims, 1 Drawing Sheet

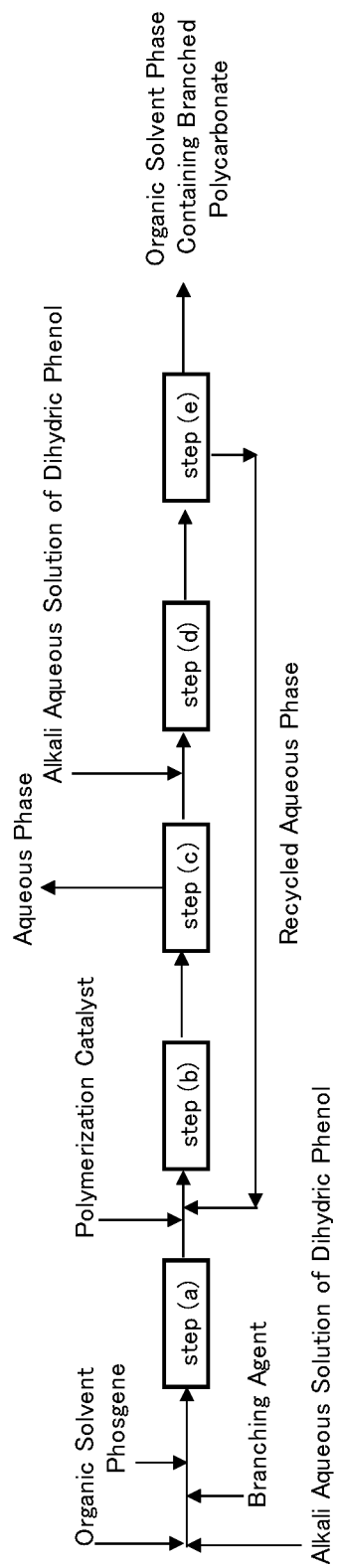

BRANCHED POLYCARBONATE PRODUCTION METHOD

CROSS-REFERENCE TO RELATED APPLICATIONS

The present application is a U.S. national stage entry of International Patent Application No. PCT/JP2015/081309, filed Nov. 6, 2015, which claims the benefit of priority to Japanese Patent Application No. 2014-227409, filed Nov. 7, 2014, the entireties of which are hereby incorporated by reference.

TECHNICAL FIELD

The present invention relates to a method of producing a branched polycarbonate, and more specifically, to a method of producing a branched polycarbonate excellent in production efficiency, based on an interfacial polymerization method.

BACKGROUND ART

Polycarbonates each have excellent characteristics, such as transparency, heat resistance, and mechanical characteristics, and hence have been used in a wide variety of applications including: casings for OA equipment and a household electric appliance; parts in electrical and electronic fields; and optical materials, such as a lens. Many of the polycarbonates used in the wide variety of applications are each a linear polymer obtained by causing a dihydric phenol and a carbonate precursor, such as phosgene, to react with each other. However, the polymer shows Newtonian flow behavior under a melt processing condition, and hence when blow molding, extrusion molding, or foam molding is performed, drawdown is liable to occur owing to its self-weight. The drawdown causes a problem particularly in the case of large-scale molding.

In order to alleviate such problem, a branched polycarbonate that shows non-Newtonian flowability under a melt processing condition and hence hardly causes drawdown at the time of its melting has been preferably adopted in the above-mentioned molding applications.

The production of the branched polycarbonate through the use of an interfacial polymerization method or an ester exchange method has been known as a method of producing the polycarbonate. When the branched polycarbonate is produced by using the ester exchange method, raw material components are melted under high temperature and subjected to an ester exchange reaction for polymerization. The branched polycarbonate to be obtained is liable to color owing to, for example, an influence by a polymerization catalyst to be used in the reaction. Therefore, it is not preferred to produce the branched polycarbonate through the use of the ester exchange method in an application where transparency is required.

As a method of producing the branched polycarbonate through the use of the interfacial polymerization method, in Patent Document 1, there is a disclosure of two production methods, i.e., a method involving using a polycarbonate oligomer into which a branching agent has been incorporated, and causing the polycarbonate oligomer and a dihydric phenol to react with each other to provide the branched polycarbonate, and a method involving using a polycarbonate oligomer into which no branching agent has been incorporated, and causing the polycarbonate oligomer, and a branching agent and a dihydric phenol to react with one another to provide the branched polycarbonate.

In the former method involving using the polycarbonate oligomer into which the branching agent has been incorporated, and causing the polycarbonate oligomer and the dihydric phenol to react with each other to provide the branched polycarbonate, a unit derived from the branching agent in the branched polycarbonate becomes more uniform as compared to the latter method involving using the polycarbonate oligomer into which no branching agent has been incorporated, and causing the polycarbonate oligomer, and the branching agent and the dihydric phenol to react with one another to provide the branched polycarbonate, and hence physical properties become more uniform than those in the latter production method. Accordingly, the former method is a preferred method.

However, the method involving using the polycarbonate oligomer, into which the branching agent has been incorporated, and causing the polycarbonate oligomer and the dihydric phenol to react with each other to provide the branched polycarbonate involves the following problem. When the polycarbonate oligomer into which the branching agent has been incorporated is continuously produced, an intermediate phase occurs at the time of the separation of a reaction liquid containing the polycarbonate oligomer into which the branching agent has been incorporated into an organic solvent phase containing the polycarbonate oligomer and an aqueous phase to deteriorate separability, and hence production efficiency remarkably reduces.

CITATION LIST

Patent Document

Patent Document 1: JP 7-103235 B2

SUMMARY OF INVENTION

Technical Problem

An object of the present invention is to provide a method by which a branched polycarbonate is produced with high production efficiency at the time of the production of the branched polycarbonate through the use of an interfacial polymerization method, the production method including using a polycarbonate oligomer into which a branching agent has been incorporated, and causing the polycarbonate oligomer and a dihydric phenol to react with each other.

Solution to Problem

The inventors of the present invention have made extensive investigations, and as a result, have found that the object is achieved by setting a relationship between the addition amount of a polymerization catalyst to be added and the chloroformate group amount of the polycarbonate oligomer to a specific ratio at the time of the production of the polycarbonate oligomer. Thus, the inventors have completed the present invention.

That is, the present invention relates to the following items [1] to [11].

[1] A method of producing a branched polycarbonate, comprising:
a step (a) of subjecting an alkali aqueous solution of a dihydric phenol, phosgene, and a branching agent to a phosgenation reaction in the presence of an organic solvent to provide a reaction liquid;

a step (b) of adding the alkali aqueous solution of the dihydric phenol and a polymerization catalyst to the reaction liquid obtained from the step (a) to provide a reaction liquid containing a polycarbonate oligomer;

a step (c) of separating the reaction liquid containing the polycarbonate oligomer obtained in the step (b) into an organic solvent phase containing the polycarbonate oligomer and an aqueous phase; and a step (d) of causing the organic solvent phase containing the polycarbonate oligomer separated in the step (c) and the alkali aqueous solution of the dihydric phenol to react with each other to provide a reaction liquid containing the branched polycarbonate, wherein a ratio (x/y) of an addition amount of the polymerization catalyst to be added in the step (b), which is represented by x mol/hr, to a chloroformate group amount of the polycarbonate oligomer in the reaction liquid obtained from the step (b), which is represented by y mol/hr, is 0.0035 or more.

[2] The method of producing a branched polycarbonate according to Item [1], wherein the polycarbonate oligomer has a weight-average molecular weight of 5,000 or less.

[3] The method of producing a branched polycarbonate according to Item [1] or [2], wherein the branching agent comprises a compound represented by the following general formula (I):

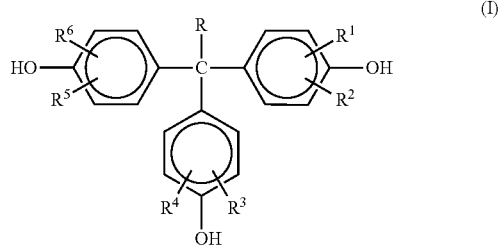

wherein R represents a hydrogen atom or an alkyl group having 1 to 5 carbon atoms, and $R^1$ to $R^6$ each represent a hydrogen atom, an alkyl group having 1 to 5 carbon atoms, or a halogen atom.

[4] The method of producing a branched polycarbonate according to Item [3], wherein the compound represented by the general formula (I) comprises 1,1,1-tris(4-hydroxyphenyl)ethane.

[5] The method of producing a branched polycarbonate according to any one of Items [1] to [4], wherein the dihydric phenol comprises a compound represented by the following general formula (1):

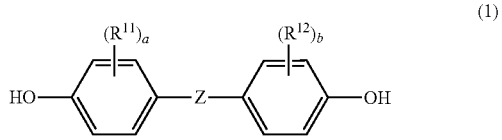

wherein $R^{11}$ and $R^{12}$ each independently represent a halogen atom, an alkyl group having 1 to 6 carbon atoms, or an alkoxy group having 1 to 6 carbon atoms, Z represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

[6] The method of producing a branched polycarbonate according to Item [5], wherein the compound represented by the general formula (1) comprises 2,2-bis(4-hydroxyphenyl)propane.

[7] The method of producing a branched polycarbonate according to any one of Items [1] to [6], further comprising adding a terminal stopper to the reaction liquid obtained from the step (a).

[8] The method of producing a branched polycarbonate according to any one of Items [1] to [7], further comprising a step (e) of separating the reaction liquid containing the branched polycarbonate obtained in the step (d) into an organic solvent phase containing the branched polycarbonate and an aqueous phase containing an unreacted dihydric phenol.

[9] The method of producing a branched polycarbonate according to Item [8], wherein at least part of the aqueous phase containing the unreacted dihydric phenol separated in the step (e) is used as the alkali aqueous solution of the dihydric phenol to be added in the step (b).

[10] The method of producing a branched polycarbonate according to any one of Items [1] to [9], wherein the chloroformate group amount of the polycarbonate oligomer in the reaction liquid obtained from the step (b) is defined as a molar amount per unit time of the organic solvent phase containing the polycarbonate oligomer separated in the step (c).

[11] The method of producing a branched polycarbonate according to any one of Items [1] to [10], wherein the polymerization catalyst comprises triethylamine.

Advantageous Effects of Invention

According to the method of producing a branched polycarbonate of the present invention, the occurrence of an intermediate phase can be suppressed at the time of the separation of the reaction liquid containing the polycarbonate oligomer into the organic solvent phase containing the polycarbonate oligomer and the aqueous phase, and hence separability is improved and the production efficiency of the branched polycarbonate can be improved.

BRIEF DESCRIPTION OF DRAWINGS

FIGURE is a schematic view of a product ion process for a branched polycarbonate of the present invention.

DESCRIPTION OF EMBODIMENTS

A method of producing a branched polycarbonate of the present invention comprises: a step (a) of subjecting an alkali aqueous solution of a dihydric phenol, phosgene, and a branching agent to a phosgenation reaction in the presence of an organic solvent to provide a reaction liquid; a step (b) of adding the alkali aqueous solution of the dihydric phenol and a polymerization catalyst to the reaction liquid obtained from the step (a) to provide a reaction liquid containing a polycarbonate oligomer; a step (c) of separating the reaction liquid containing the polycarbonate oligomer obtained in the step (b) into an organic solvent phase containing the polycarbonate oligomer and an aqueous phase; and a step (d) of causing the organic solvent phase containing the polycarbonate oligomer separated in the step (c) and the alkali aqueous solution of the dihydric phenol to react with each other to provide a reaction liquid containing the branched polycarbonate, wherein a ratio (x/y) of an addition amount of the polymerization catalyst to be added in the step (b), which is represented by x mol/hr, to a chloroformate group amount of the polycarbonate oligomer in the reaction liquid obtained from the step (b), which is represented by y mol/hr, is 0.0035 or more.

The method of producing a branched polycarbonate of the present invention is described in detail below. In this description, a provision considered to be preferred can be arbitrarily adopted, and a combination of preferred provisions can be said to be more preferred.

[Step (a)]

The step (a) is a step of subjecting the alkali aqueous solution of the dihydric phenol, phosgene, and the branching agent to the phosgenation reaction in the presence of the organic solvent to provide the reaction liquid. Raw materials to be used in the step (a) and reaction conditions for the step are described.

<Alkali Aqueous Solution of Dihydric Phenol>

A dihydric phenol to be used in the production of a polycarbonate is used as the dihydric phenol. A dihydric phenol represented by the following general formula (1) is preferably used as the dihydric phenol:

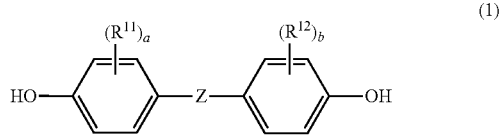

(1)

wherein in the general formula (1), $R^{11}$ and $R^{12}$ each independently represent a halogen atom, an alkyl group having 1 to 6 carbon atoms, or an alkoxy group having 1 to 6 carbon atoms, Z represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

The dihydric phenol represented by the general formula (1) is not particularly limited, but 2,2-bis(4-hydroxyphenyl)propane [trivial name: bisphenol A] is suitable.

Examples of the dihydric phenol except bisphenol A include: bis(hydroxyaryl)alkanes, such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes, such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers, such as 4,4'-dihydroxydiphenyl ether and 4,4'-dihydroxy-3,3'-dimethylphenyl ether; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; dihydroxydiaryl sulfones, such as 4,4'-dihydroxydiphenyl sulfone and 4,4'-dihydroxy-3,3'-dimethyldiphenyl sulfone; dihydroxydiphenyls, such as 4,4'-dihydroxydiphenyl; dihydroxydiarylfluorenes, such as 9,9-bis(4-hydroxyphenyl)fluorene and 9,9-bis(4-hydroxy-3-methylphenyl)fluorene; dihydroxydiaryladamantanes, such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

Each of those dihydric phenols may be used alone, or two or more thereof may be used as a mixture.

The dihydric phenol is used as an alkali aqueous solution, and an alkali to be used at this time may be, for example, an alkali hydroxide, in particular, a strongly basic hydroxide, such as sodium hydroxide or potassium hydroxide. Normally, an alkali aqueous solution having an alkali concentration of from 1 mass % to 15 mass % is preferably used as the alkali aqueous solution. In addition, the content of the dihydric phenol in the alkali aqueous solution is typically selected from the range of from 0.5 mass % to 20 mass %.

<Phosgene>

Phosgene to be used in the step (a) is a compound obtained by causing chlorine and carbon monoxide to react with each other at a ratio of carbon monoxide of typically from 1.01 mol to 1.3 mol with respect to 1 mol of chlorine through the use of activated carbon as a catalyst. When phosgene is used as a phosgene gas, a phosgene gas containing about 1 vol % to about 30 vol % of unreacted carbon monoxide can be used. Phosgene in a liquefied state can also be used.

<Branching Agent>

The branching agent to be used in the step (a) is not particularly limited, and a known branching agent can be used. A branched polycarbonate that hardly causes drawdown at the time of its melting can be obtained by using, among the known branching agents, a compound represented by the following general formula (I):

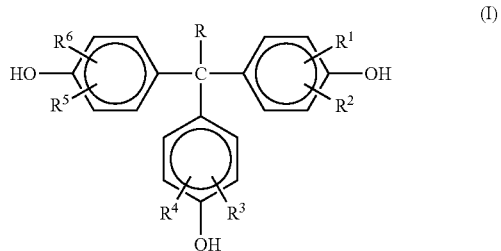

(I)

wherein R represents a hydrogen atom or an alkyl group having 1 to 5 carbon atoms, and $R^1$ to $R^6$ each represent a hydrogen atom, an alkyl group having 1 to 5 carbon atoms, or a halogen atom.

In the general formula (I), examples of the alkyl group having 1 to 5 carbon atoms represented by R include a methyl group, an ethyl group, a n-propyl group, a n-butyl group, and a n-pentyl group. In addition, examples of the alkyl group having 1 to 5 carbon atoms represented by each of $R^1$ to $R^6$ include a methyl group, an ethyl group, a n-propyl group, a n-butyl group, and a n-pentyl group, and examples of the halogen atom represented by each of $R^1$ to $R^6$ include a chlorine atom, a bromine atom, and a fluorine atom. Specific examples of the branching agent represented by the general formula (I) include 1,1,1-tris(4-hydroxyphenyl)methane, 1,1,1-tris(4-hydroxyphenyl)ethane, 1,1,1-tris(4-hydroxyphenyl)propane, 1,1,1-tris(2-methyl-4-hydroxyphenyl)methane, 1,1,1-tris(2-methyl-4-hydroxyphenyl)ethane, 1,1,1-tris(3-methyl-4-hydroxyphenyl)methane, 1,1,1-tris(3-methyl-4-hydroxyphenyl)-ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl)ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dibromo-4-hydroxyphenyl)methane, and 1,1,1-tris(3,5-dibromo-4-hydroxyphenyl)ethane. Among the branching agents each represented by the general formula (I), 1,1,1-tris(4-hydroxyphenyl)ethane [hereinafter sometimes referred to as THPE] is particularly preferably used from the viewpoint of the branching property of the branched polycarbonate.

<Organic Solvent>

The organic solvent to be used in the step (a) is, for example, a solvent that dissolves a polycarbonate oligomer and a branched polycarbonate. Specific examples thereof include halogenated hydrocarbon solvents, such as dichloromethane (methylenechloride), dichloroethane, trichloroethane, tetrachloroethane, pentachloroethane, hexachloroethane, dichloroethylene, chlorobenzene, and dichlorobenzene. Among them, dichloromethane (methylene chloride) is particularly preferred.

<Reactor>

In the step (a), the alkali aqueous solution of the dihydric phenol and the branching agent, and phosgene intensely react with one another to involve heat generation, and hence the reaction product is desirably cooled to from 0° C. to 50° C. in order to suppress a side reaction. Therefore, a reactor provided with a cooling facility for cooling the reaction product is preferably used as a reactor to be used in the step (a). In addition, when the alkali aqueous solution of the dihydric phenol, phosgene, the branching agent, and the organic solvent are continuously introduced into the reactor, the raw materials are preferably subjected to the phosgenation reaction in such a state that the reaction liquid is brought into a turbulent state in the reactor. A mixing reactor is desirably used as such reactor, and the mixing reactor is preferably a static mixer. The static mixer is preferably a tubular reactor having in itself an element having an action of dividing, converting, or inverting a fluid, and the element generally has a shape obtained by twisting a rectangular plate by 180°. The reaction mixture introduced into the reactor is divided into two portions every time the mixture passes one element. In addition, the reaction mixture fluid or the reaction product fluid are converted by moving from the central portion of the tube to the wall portion thereof and from the wall portion of the tube to the central portion along a spiral surface in the element. In addition, the rotation direction of the fluid is changed every one element, and hence the fluid undergoes abrupt inversion of an inertial force to be turbulently stirred.

When the tubular static mixer described above is used as the reactor, in the reactor, air bubbles in the liquid are reduced in size to enlarge a contact interface between the raw materials, and hence reaction efficiency is drastically improved.

<Ratio at which Each Raw Material is Introduced into Reactor>

The alkali aqueous solution of the dihydric phenol, phosgene, the branching agent, and the organic solvent are introduced into the reactor to be used in the step (a), and are mixed and subjected to the phosgenation reaction. Here, the usage amount of the organic solvent is desirably selected so that a volume ratio between an organic solvent phase and an aqueous phase may be from 5/1 to 1/7, preferably from 2/1 to 1/4. With regard to the usage amount of phosgene, phosgene is preferably used in excess so that its amount may be typically from 1.05 mol to 1.5 mol, preferably from 1.1 mol to 1.3 mol with respect to 1 mol of the dihydric phenol. With regard to a usage molar ratio between the dihydric phenol and the branching agent, the dihydric phenol and the branching agent are preferably used so that a molar ratio "dihydric phenol:branching agent" may typically fall within the range of from 99:1 to 90:10, and preferably fall within the range of from 98:2 to 92:8. The branching agent is desirably introduced after having been dissolved in the alkali aqueous solution because the branching agent represented by the general formula (I) can be dissolved in the alkali aqueous solution, though the solubility of the branching agent varies depending on the branching agent to be used. A branching agent that is difficult to dissolve in the alkali aqueous solution is desirably introduced after having been dissolved in an organic solvent, such as methylene chloride.

In the phosgenation reactor, heat is generated by a reaction in which terminal groups of the dihydric phenol and the branching agent are each turned into a chloroformate by phosgene, or a reaction in which phosgene is decomposed by the alkali, and hence the temperature of the reaction product increases. Accordingly, the reaction product is preferably cooled so that the temperature may be from 0° C. to 80° C., preferably from 5° C. to 70° C. When the tubular static mixer described above is used as the reactor, an exothermic reaction starts from the confluence point of the alkali aqueous solution of the dihydric phenol and the branching agent, and phosgene, and hence the cooling is preferably performed also at the confluence point. As the reaction product flows in the reactor of the tubular static mixer toward the outlet of the reactor, phosgene is consumed and hence the generation of intense heat of reaction is prevented. A primary object of the reaction in the step (a) is to turn each of the terminal groups of the dihydric phenol and the branching agent into a chloroformate with phosgene, and hence substantially no oligomerization reaction advances.

[Step (b)]

The step (b) is a step of adding the alkali aqueous solution of the dihydric phenol and the polymerization catalyst to the reaction liquid obtained from the step (a) to provide the reaction liquid containing the polycarbonate oligomer. Raw materials to be used in the step (b) and reaction conditions for the step are described.

As described above, substantially no oligomerization reaction advances in the step (a), and hence the polycarbonate oligomer is produced by performing an oligomerization reaction in the step (b) to increase the molecular weight of the reaction product of the step (a). In the step (b), the oligomerization reaction is performed by adding the alkali aqueous solution of the dihydric phenol and the polymerization catalyst to the reaction liquid obtained from the step (a). The alkali aqueous solution of the dihydric phenol described in the step (a) is used as the alkali aqueous solution of the dihydric phenol to be used here.

<Polymerization Catalyst>

A known catalyst to be used at the time of the interfacial polymerization of a polycarbonate resin can be used as the polymerization catalyst to be used in the step (b). A phase transfer catalyst, such as a tertiary amine or a salt thereof, a quaternary ammonium salt, or a quaternary phosphonium salt, can be preferably used as the catalyst. Examples of the tertiary amine include triethylamine, tributylamine, N,N-dimethylcyclohexylamine, pyridine, and dimethylaniline, and examples of the tertiary amine salt include hydrochloric acid salts and bromic acid salts of the tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide, and examples of the quaternary phosphonium salt include tetrabutylphosphonium chloride and tetrabutylphosphonium bromide. Each of those catalysts may be used alone, or two or more thereof may be used in combination. Among the catalysts, tertiary amines are preferred, and triethylamine is particularly suitable. When the catalyst is in a liquid state, each of those catalysts can be introduced as it is or after having been dissolved in an organic solvent or water. When the catalyst is in a solid state, each of those catalysts can be introduced after having been dissolved in an organic solvent or water.

A stirring tank is generally used as a reactor to be used in the step (b). The stirring tank is not particularly limited as long as the stirring tank is a tank-type one having a stirrer.

The reaction liquid obtained from the step (a) is introduced into the reactor for advancing the oligomerization reaction. The residual amounts of an unreacted dihydric phenol and a remaining alkali component in the reaction liquid obtained from the step (a) are small, and hence in order that the oligomerization reaction may be advanced, the reaction needs to be performed by adding the dihydric phenol and the alkali component, furthermore.

The oligomerization reaction of the step (b) is advanced by a reaction between a compound in which the terminal groups of the dihydric phenol and the branching agent have each been turned into a chloroformate by phosgene in the reaction liquid obtained from the step (a), and the dihydric phenol in the presence of the alkali in the reactor to be used. In the method of producing a branched polycarbonate of the present invention, the oligomerization reaction can be advanced by, for example, introducing the alkali aqueous solution of the dihydric phenol prepared in advance to be used in the step (a) into the reactor, and introducing the alkali aqueous solution prepared in advance into the reactor in addition to the foregoing solution.

As another method, the oligomerization reaction can be advanced by: recycling an aqueous phase out of an organic solvent phase and the aqueous phase obtained by the separation of the reaction liquid containing the branched polycarbonate obtained after a polycondensation step [aqueous phase obtained in a step (e) to be described later]; and introducing the recycled aqueous phase into the reactor of the step (b). The aqueous phase obtained in the step (e) contains an unreacted dihydric phenol and an alkali, and the dihydric phenol and the alkali can be effectively used by recycling the aqueous phase. The aqueous phase after the polycondensation step may contain sodium carbonate produced by a decomposition reaction of a chloroformate group of the polycarbonate oligomer without contributing to polymerization and sodium hydroxide during polycondensation.

The dihydric phenol to be added in the step (b) is desirably added at a concentration of typically from 0.05 mol/L to 0.15 mol/L (here, L means liter), preferably from 0.06 mol/L to 0.12 mol/L, more preferably from 0.06 mol/L to 0.08 mol/L, and the alkali to be added in the step (b) is desirably added at a concentration of typically from 0.03 mol/L to 0.25 mol/L, preferably from 0.05 mol/L to 0.22 mol/L, more preferably from 0.10 mol/L to 0.22 mol/L. The usage amount of the organic solvent in the reaction liquid of the step (b) is typically selected so that a volume ratio between an organic phase and an aqueous phase may be preferably from 5/1 to 1/7, more preferably from 2/1 to 1/4.

The step (b) is a step of obtaining the reaction liquid containing the polycarbonate oligomer, and an upper limit for the weight-average molecular weight of the oligomer is preferably 5,000, and a lower limit therefor is typically about 500. In the step (b), a terminal stopper is preferably added for setting the weight-average molecular weight of the polycarbonate oligomer to 5,000 or less. The addition of the terminal stopper facilitates the adjustment of the weight-average molecular weight of the polycarbonate oligomer in the step (b) to 5,000 or less. The terminal stopper is not particularly limited, and a terminal stopper to be used in the production of a polycarbonate can be used. Specific examples of a compound to be used as the terminal stopper may include monohydric phenols, such as phenol, p-cresol, p-tert-butylphenol, p-tert-octylphenol, p-cumylphenol, 3-pentadecylphenol, bromophenol, tribromophenol, and nonylphenol. Among them, at least one selected from p-tert-butylphenol, p-cumylphenol, and phenol is preferred in terms of, for example, economical efficiency and ease of availability. Each of those terminal stoppers may be introduced into the step (b) after having been dissolved in an organic solvent, such as methylene chloride, and having been added to the reaction liquid obtained from the step (a), or may be introduced by direct addition to the reactor to be used in the step (b).

The reaction is performed while a temperature in the reactor in the step (b) is maintained at a temperature within the range of typically from 5° C. to 50° C., preferably from 5° C. to 40° C. With regard to a stirring condition, the reaction liquid is stirred under such a relatively moderate condition that the liquid becomes a laminar flow. The retention time of the reaction liquid in the reactor is generally from 15 minutes to 60 minutes, though the time varies depending on, for example, the target molecular weight of the polycarbonate oligomer and the properties of the reaction liquid obtained from the step (a).

In the method of producing a branched polycarbonate of the present invention, a ratio (x/y) of the addition amount of the polymerization catalyst to be added in the step (b), which is represented by x mol/hr, to the chloroformate group amount of the polycarbonate oligomer in the reaction liquid obtained from the step (b), which is represented by y mol/hr, needs to be 0.0035 or more. A ratio (x/y) of less than 0.0035 is not preferred because when the reaction liquid obtained from the step (b) is separated into the organic solvent phase containing the polycarbonate oligomer and the aqueous phase in the step (c), a large amount of an intermediate phase occurs to deteriorate the separability of the reaction liquid, and hence the production efficiency of the branched polycarbonate reduces. The ratio (x/y) is preferably 0.0038 or more, more preferably 0.0042 or more. An upper limit for the ratio (x/y) is typically 0.023 or less from the viewpoint that a reducing effect on the production amount of the intermediate phase does not change. In order to set the ratio (x/y) to the above-mentioned value, in normal cases, the addition amount of the polymerization catalyst to be added in the step (b) is desirably adjusted in accordance with the chloroformate group amount of the polycarbonate oligomer in the reaction liquid obtained from the step (b).

The chloroformate group amount of the polycarbonate oligomer in the reaction liquid obtained from the step (b) is measured as described below. The reaction liquid containing the polycarbonate oligomer obtained from the step (b) is sampled, and is separated into the organic solvent phase containing the polycarbonate oligomer and the aqueous phase by, for example, settled separation or centrifugal separation. The chloroformate group concentration of the polycarbonate oligomer in the resultant organic solvent phase is determined, and a molar amount per unit time can be determined from the chloroformate group concentration and the amount (flow rate) of the organic solvent phase containing the polycarbonate oligomer separated from the reaction liquid obtained from the step (b). Alternatively, the molar amount per unit time can also be determined as follows: the reaction liquid obtained from the step (b) is separated in the step (c), and the molar amount per unit time is determined from the extraction amount (flow rate) of the separated organic solvent phase containing the polycarbonate oligomer and the chloroformate group concentration of the oligomer.

[Step (c)]

The step (c) is a step of separating the reaction liquid containing the polycarbonate oligomer obtained in the step (b) into the organic solvent phase containing the polycarbonate oligomer and the aqueous phase. A settled separation tank is preferably used as an apparatus to be used in the step (c). The reaction liquid containing the polycarbonate oligomer obtained in the step (b) is introduced into the settled separation tank, and is separated into the organic solvent phase containing the polycarbonate oligomer and the aqueous phase by their specific gravity difference. The organic solvent phase containing the polycarbonate oligomer serving as a lower layer is continuously or intermittently extracted from the lower side of the settled separation tank. The aqueous phase serving as an upper layer is continuously or intermittently extracted, and the level of each phase in the settled separation tank is maintained so as to fall within a certain level range. In the step (c), the organic solvent phase containing the polycarbonate oligomer is continuously or intermittently extracted from the lower side of the settled separation tank. Here, as described above, a value for the ratio (x/y) can be determined from the chloroformate group concentration of the polycarbonate oligomer in the organic solvent phase determined in advance and the extraction amount of the phase.

[Step (d)]

The step (d) is a step of causing the organic solvent phase containing the polycarbonate oligomer separated in the step (c) and the alkali aqueous solution of the dihydric phenol to react with each other to provide the reaction liquid containing the branched polycarbonate. In the step (d), the polycarbonate oligomer and the dihydric phenol are subjected to a polycondensation reaction in the presence of the alkali aqueous solution and the organic solvent, and the molecular weight of the branched polycarbonate is adjusted to fall within a target molecular weight range. The polycondensation reaction is performed until the molecular weight of the branched polycarbonate to be obtained typically falls within the range of from about 10,000 to about 50,000 in terms of a viscosity-average molecular weight.

Specifically, the organic solvent phase containing the polycarbonate oligomer separated in the step (c), the terminal stopper to be used as desired, the catalyst to be used as desired, the organic solvent, the alkali aqueous solution, and the alkali aqueous solution of the dihydric phenol are mixed, and the mixture is subjected to interfacial polycondensation at a temperature in the range of typically from 0° C. to 50° C., preferably from 20° C. to 40° C.

Examples of the alkali of the alkali aqueous solution, the organic solvent, the terminal stopper, and the catalyst to be used in the step (d) may include the same examples as those described in the step (a) or (b). In the step (d), the usage amount of the organic solvent in the interfacial polycondensation is typically selected so that a volume ratio between an organic phase and an aqueous phase may be preferably from 7/1 to 1/1, more preferably from 5/1 to 2/1.

With regard to a reactor to be used in the step (d), the reaction can be completed with only one reactor depending on the ability of the reactor. A plurality of reactors, such as a second reactor and a third reactor subsequent to the first reactor, can also be further constructed and used as required. A stirring tank, a tower-type stirring tank with a vertical multistage impeller, a non-stirring tank, a static mixer, a line mixer, an orifice mixer, a pipe, and the like can be used as those reactors. Those reactors may be arbitrarily combined to be used as a plurality of reactors.

As described above, the reaction liquid containing the branched polycarbonate is obtained by the step (a) to the step (d). It is preferred that the method of producing a branched polycarbonate of the present invention further include the following step (e), and at least part of an aqueous phase containing an unreacted dihydric phenol from the following step (e) be used as the alkali aqueous solution of the dihydric phenol to be added in the step (b). The step (e) is described below.

[Step (e)]

The step (e) is a step of separating the reaction liquid containing the branched polycarbonate obtained in the step (d) into an organic solvent phase containing the branched polycarbonate and the aqueous phase containing the unreacted dihydric phenol. An apparatus to be used for the separation into the organic solvent phase containing the branched polycarbonate and the aqueous phase containing the unreacted dihydric phenol in the step (e) may be, for example, a settling tank or a centrifugal separator. The organic solvent phase containing the branched polycarbonate separated in the step (e) is sequentially subjected to alkali washing, acid washing, and pure water washing to provide an organic solvent phase containing a purified branched polycarbonate. The organic solvent phase containing the purified polycarbonate is concentrated as required to provide an organic solvent solution containing the purified polycarbonate, and the solution is subjected to a kneader treatment, warm water granulation, or the like. Thus, branched polycarbonate powder can be obtained. The organic solvent remains in the resultant branched polycarbonate powder, and hence branched polycarbonate powder from which the organic solvent has been removed can be obtained by performing a drying treatment, such as a heating treatment. Various molded bodies can be obtained by pelletizing the resultant branched polycarbonate powder with a pelletizer or the like.

The aqueous phase separated in the step (e) contains the unreacted dihydric phenol and the alkali, and the total amount or part of the aqueous phase is preferably recycled in the step (b) from the viewpoint of effective utilization of the raw materials.

EXAMPLES

The present invention is hereinafter described more specifically by way of Examples. The present invention is not limited by these examples. Measurements and evaluations in Examples and Comparative Examples were performed by the following methods.

<Measurement of Weight-average Molecular Weight (Mw)>

A weight-average molecular weight (Mw) was measured as a molecular weight in terms of standard polystyrene (weight-average molecular weight: Mw) by GPC [column: TOSOH TSK-GEL MULTIPORE HXL-M (2 columns)+ Shodex KF801 (1 column), temperature: 40° C., flow rate: 1.0 ml/min, detector: RI] using tetrahydrofuran (THF) as a developing solvent.

<Measurement of Chloroformate Group Concentration (CF Value)>

Measurement was performed on the basis of a chlorine ion concentration with reference to JIS K 8203 by using redox titration and silver nitrate titration.

<Evaluation of Oligomerization Reaction Liquid in Settling Tank>

With regard to the separability of an oligomerization reaction liquid in a settling tank, the concentration of moisture in an organic solvent phase and the thickness of an intermediate phase after the liquid had been left at rest for 60 minutes were measured. A larger numerical value for each of the concentration and the thickness means that the separability is worse. A solid matter content in an aqueous phase was determined by: loading methylene chloride into the aqueous phase; mixing the aqueous phase and methylene chloride; then subjecting the mixture to oil-water separation to provide a methylene chloride phase; evaporating the methylene chloride phase to dryness; measuring the weight of the residue; and converting the weight into a mass fraction in the solution. A larger solid matter content means that the intermediate phase flows out toward the aqueous phase to a larger extent.

<Measurement of Viscosity-average Molecular Weight (Mv)>

The viscosity-average molecular weight (Mv) of a polycarbonate is calculated from the following expression by using a limiting viscosity [η] determined by measuring the viscosity of a methylene chloride solution at 20° C. with an Ubbelohde-type viscometer.

$$[\eta] = 1.23 \times 10^{-5} M_v^{0.83}$$

Example 1

<Production of Polycarbonate Oligomer>

A polycarbonate oligomer was produced in accordance with a scheme illustrated in FIGURE.

First, 6.0 mass % aqueous sodium hydroxide was prepared. Then, a 13.5 mass % (in terms of solid matter) solution of bisphenol A (abbreviated as "BPA") in aqueous sodium hydroxide was prepared by dissolving BPA in the aqueous sodium hydroxide. Next, a 24 mass % solution was prepared by dissolving p-tert-butylphenol (PTBP) in methylene chloride.

The solution of BPA in aqueous sodium hydroxide, methylene chloride, and an 11 mass % (in terms of solid matter) solution of 1,1,1-tris(4-hydroxyphenyl)ethane (abbreviated as "THPE") in aqueous sodium hydroxide prepared by dissolving THPE serving as a branching agent in 5.1 mass % aqueous sodium hydroxide were continuously supplied to a tubular reactor having an inner diameter of 6 mm and a length of 26 m at flow rates of 36 L/hr, 15.4 L/hr, and 0.7 L/hr, respectively. A molar ratio "dihydric phenol (BPA): branching agent (THPE)" is 98.9:1.1. Simultaneously with the supply, phosgene was continuously blown into the tubular reactor at a flow rate of 3.1 kg/hr to perform a phosgenation reaction, and the solution of PTBP was supplied at a flow rate of 310 mL/hr. Thus, a reaction liquid containing a phosgenation reaction product was obtained. At this time, the tubular reactor was cooled so that the temperature of the reaction product at the outlet of the tubular reactor became 30° C. Phosgene used here was separately synthesized from carbon monoxide (CO) and chlorine ($Cl_2$).

Then, an oligomerization reaction was performed by: continuously supplying the reaction liquid and 210 mL/hr (0.062 mol/hr) of a 3 mass % aqueous solution of triethylamine (abbreviated as "TEA") prepared in advance as a catalyst to an oligomerization reactor [step (b)] having an internal volume of 100 L and provided with a stirrer; and introducing 15.7 L/hr of a recycled aqueous phase obtained from the step [step (e)] of separating a reaction liquid obtained from a polycondensation reaction [step (d)] to be described later into an aqueous phase and an organic solvent phase containing a polycarbonate to the oligomerization reactor. The concentration of BPA in an aqueous phase, "aqueous phase after the confluence of the recycled aqueous phase from the [step (e)] and an aqueous phase (pure water) to be additionally introduced for concentration adjustment" before the introduction into the oligomerization reactor, was 0.07 mol/L, the concentration of sodium hydroxide therein was 0.13 mol/L, and the concentration of sodium carbonate therein was 0.08 mol/L. The oligomerization reaction was performed in a laminar flow state by rotating the inside of the oligomerization reactor at 350 rpm. A reaction liquid extracted from the bottom portion of the oligomerization reactor was continuously supplied to a horizontal settling tank (having an inner diameter of 350 mm and an internal volume of 100 L) through a transfer pipe [made of SUS, pipe diameter: 12.7 mm (½ inch)], and the separation of an aqueous phase and an organic solvent phase [step (c)] was performed. The reaction liquid containing a polycarbonate oligomer was separated into an aqueous phase and an organic solvent phase in the horizontal settling tank. The organic solvent phase was continuously extracted from the horizontal settling tank at a flow rate of 20 L/hr, and a chloroformate group concentration in the extracted organic solvent phase was 0.72 mol/L. In addition, the weight-average molecular weight of the polycarbonate oligomer in the organic solvent phase was 3,100. After the above-mentioned continuous operation had been performed for 24 hours, the aqueous phase and the organic solvent phase in the horizontal settling tank were observed. As a result, an intermediate phase slightly occurred between the aqueous phase and the organic solvent phase. However, the thickness of the intermediate phase was about 9.0 mm (corresponding to 3.2 L), and even when settled separation was continuously performed, the thickness of the intermediate phase did not increase, and hence the reaction liquid was able to be satisfactorily separated into the aqueous phase and the organic solvent phase. A moisture content in the organic solvent phase after the separation was 2,000 ppm by mass, and a solid matter content in the aqueous phase after the separation was less than 10 ppm by mass. The chloroformate group amount (y) of the polycarbonate oligomer in the organic solvent phase continuously extracted from the horizontal settling tank is 20×0.72=14 0.4 mol/hr. The addition amount (x) of TEA used as a polymerization catalyst to the oligomerization reactor was 0.062 mol/hr, and hence a ratio (x/y) was equal to 0.0043.

<Production of Branched Polycarbonate>

A polycondensation reaction was performed in the step (d) by using the organic solvent phase containing the polycarbonate oligomer (sometimes abbreviated as "PCO") separated from the horizontal settling tank in accordance with the scheme illustrated in FIGURE. The organic solvent phase containing the polycarbonate oligomer (PCO), the solution of BPA in aqueous sodium hydroxide (solution used in the production of the polycarbonate oligomer), the aqueous solution of TEA having a concentration of 3 mass % serving as a catalyst, the solution of PTBP serving as a terminal stopper, aqueous sodium hydroxide having a concentration of 20 mass %, and methylene chloride serving as a solvent were introduced into the polycondensation reactor of the step (d) at flow rates of 20 L/hr, 9.8 L/hr, 0.10 L/hr, 0.34 L/hr, 1.3 L/hr, and 13.5 L/hr, respectively to perform the polycondensation reaction. Two reactors, i.e., a line mixer and a tower-type reactor were used as reactors used in the polycondensation reactor. A reaction mixture overflowing out of the upper portion of the tower-type reactor was subjected to settled separation to be separated into an aqueous phase and an organic solvent phase [step (e)]. The total amount of the separated aqueous phase was introduced into the oligomerization reactor of the step (b) and recycled. In addition, the resultant organic solvent phase was sequentially washed with aqueous sodium hydroxide whose pH had been adjusted to 13.5, an aqueous solution of hydrochloric acid whose pH had been adjusted to 1.5, and pure water to provide a clear methylene chloride solution of a branched polycarbonate.

Methylene chloride was removed from the resultant methylene chloride solution of the branched polycarbonate by evaporation with a kneader. Thus, branched polycarbonate powder was obtained. Further, remaining methylene chloride was removed by heat drying until its content became 100 ppm or less. Thus, white branched polycarbonate powder was obtained. The viscosity-average molecular weight (Mv) of the powder was measured. As a result, the viscosity-average molecular weight was 23,000.

Example 2

The same procedure as that of Example 1 was performed except that the flow rate of the 3 mass % aqueous solution of TEA added to the oligomerization reactor [step (b)] was changed to 310 mL/hr (0.092 mol/hr), and the ratio (x/y) was set to 0.0064. At that time, an intermediate phase slightly occurred between the aqueous phase and the organic solvent phase. However, the thickness of the intermediate phase was about 4 mm (corresponding to 1.4 L), and even when settled separation was continuously performed, the thickness of the intermediate phase did not increase, and hence the reaction liquid was able to be satisfactorily separated into the aqueous phase and the organic solvent phase. The viscosity-average molecular weight (Mv) of the branched polycarbonate was measured. As a result, the viscosity-average molecular weight was 23,000. The weight-average molecular weight of the polycarbonate oligomer in the organic solvent phase was 3,100, a moisture content in the organic solvent phase after the separation was 2,000 ppm by mass, and a solid matter content in the aqueous phase after the separation was less than 10 ppm by mass.

Comparative Example 1

The same procedure as that of Example 1 was performed except that the flow rate of the 3 mass % aqueous solution of TEA added to the oligomerization reactor [step (b)] was changed to 110 mL/hr (0.033 mol/hr), and the ratio (x/y) was set to 0.0023. At that time, a large amount of an intermediate phase occurred between the aqueous phase and the organic solvent phase, and the thickness of the intermediate phase reached about 42 mm (corresponding to 14.8 L). The intermediated phase occurred in a large amount as described above, and hence it became impossible to continuously perform settled separation and it became difficult to continuously produce a branched polycarbonate. The weight-average molecular weight of the polycarbonate oligomer in the organic solvent phase was 3,100, a moisture content in the organic solvent phase after the separation was 2,000 ppm by mass, and a solid matter content in the aqueous phase after the separation was less than 10 ppm by mass.

Reference Example 1

In Example 1, a phosgenation reaction was performed without the supply of the solution of THPE in aqueous sodium hydroxide at the time of the phosgenation reaction. The flow rate of the 3 mass % aqueous solution of TEA added to the oligomerization reactor [step (b)] together with the resultant reaction liquid containing a phosgenation reaction product was changed to 110 mL/hr (0.033 mol/hr), and the ratio (x/y) was set to 0.0023. The same procedure as that of Example 1 was performed except the foregoing. At that time, an intermediate phase slightly occurred between the aqueous phase and the organic solvent phase. However, the thickness of the intermediate phase was about 4 mm (corresponding to 1.4 L), and even when settled separation was continuously performed, the thickness of the intermediate phase did not increase, and hence the reaction liquid was able to be satisfactorily separated into the aqueous phase and the organic solvent phase. The viscosity-average molecular weight (Mv) of the resultant unbranched polycarbonate was measured. As a result, the viscosity-average molecular weight was 23,000.

It has been shown from Examples 1 and 2, and Comparative Example 1 of the present invention that in each of Examples 1 and 2 in which in the step of obtaining the reaction liquid containing the polycarbonate oligomer at the time of the production of the branched polycarbonate, the ratio between the amount of the polymerization catalyst to be added and the chloroformate group amount of the polycarbonate oligomer in the reaction liquid to be extracted is 0.0035 or more, the occurrence of an intermediate phase is suppressed and hence settled separation can be continuously performed. Meanwhile, it has been shown that in Comparative Example 1 in which the ratio is less than 0.0035, a large amount of an intermediate phase occurs to make it impossible to continuously perform settled separation. It has been shown that in Reference Example 1 in which no branching agent is used, although the amount of the polymerization catalyst is the same as that in Comparative Example 1, as in Examples 1 and 2, the occurrence of an intermediate phase is suppressed and hence settled separation can be continuously performed.

INDUSTRIAL APPLICABILITY

In the method of producing a branched polycarbonate of the present invention, the separability of the reaction liquid containing the polycarbonate oligomer is satisfactory in the step of separating the reaction liquid, and hence the production efficiency of the branched polycarbonate can be improved.

The invention claimed is:

1. A method of producing a branched polycarbonate, comprising:
    a step (a) of subjecting an alkali aqueous solution of a dihydric phenol, phosgene, and a branching agent to a phosgenation reaction in the presence of an organic solvent to provide a reaction liquid;
    a step (b) of adding the alkali aqueous solution of the dihydric phenol and a polymerization catalyst to the reaction liquid obtained from the step (a) to provide a reaction liquid containing a polycarbonate oligomer;
    a step (c) of separating the reaction liquid containing the polycarbonate oligomer obtained in the step (b) into an organic solvent phase containing the polycarbonate oligomer and an aqueous phase; and
    a step (d) of causing the organic solvent phase containing the polycarbonate oligomer separated in the step (c) and the alkali aqueous solution of the dihydric phenol to react with each other to provide a reaction liquid containing the branched polycarbonate,
    wherein a ratio (x/y) of an addition amount of the polymerization catalyst to be added in the step (b), which is represented by x mol/hr, to a chloroformate group amount of the polycarbonate oligomer in the reaction liquid obtained from the step (b), which is represented by y mol/hr, is 0.0035 or more.

2. The method of producing a branched polycarbonate according to claim 1, wherein the polycarbonate oligomer has a weight-average molecular weight of 5,000 or less.

3. The method of producing a branched polycarbonate according to claim 1, wherein the branching agent comprises a compound represented by the following general formula (I):

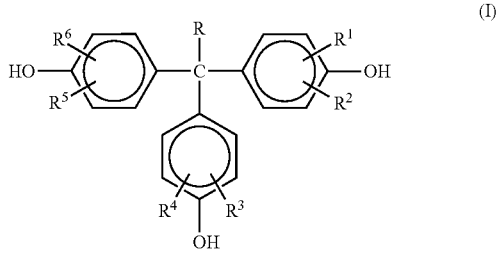

wherein R represents a hydrogen atom or an alkyl group having 1 to 5 carbon atoms, and $R^1$ to $R^6$ each represent a hydrogen atom, an alkyl group having 1 to 5 carbon atoms, or a halogen atom.

4. The method of producing a branched polycarbonate according to claim 3, wherein the compound represented by the general formula (I) comprises 1,1,1-tris(4-hydroxyphenyl)ethane.

5. The method of producing a branched polycarbonate according to claim 1, wherein the dihydric phenol comprises a compound represented by the following general formula (1):

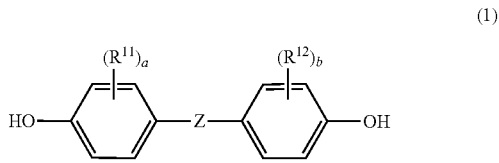

wherein $R^{11}$ and $R^{12}$ each independently represent a halogen atom, an alkyl group having 1 to 6 carbon atoms, or an alkoxy group having 1 to 6 carbon atoms, Z represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

6. The method of producing a branched polycarbonate according to claim 5, wherein the compound represented by the general formula (1) comprises 2,2-bis(4-hydroxyphenyl)propane.

7. The method of producing a branched polycarbonate according to claim 1, further comprising adding a terminal stopper to the reaction liquid obtained from the step (a).

8. The method of producing a branched polycarbonate according to claim 1, further comprising a step (e) of separating the reaction liquid containing the branched polycarbonate obtained in the step (d) into an organic solvent phase containing the branched polycarbonate and an aqueous phase containing an unreacted dihydric phenol.

9. The method of producing a branched polycarbonate according to claim 8, wherein at least part of the aqueous phase containing the unreacted dihydric phenol separated in the step (e) is used as the alkali aqueous solution of the dihydric phenol to be added in the step (b).

10. The method of producing a branched polycarbonate according to claim 1, wherein the chloroformate group amount of the polycarbonate oligomer in the reaction liquid obtained from the step (b) is defined as a molar amount per unit time of the organic solvent phase containing the polycarbonate oligomer separated in the step (c).

11. The method of producing a branched polycarbonate according to claim 1, wherein the polymerization catalyst comprises triethylamine.

* * * * *